US009830203B2

(12) United States Patent
Schnellinger et al.

(10) Patent No.: US 9,830,203 B2
(45) Date of Patent: Nov. 28, 2017

(54) METHOD FOR COMMUNICATING WITH AN APPLICATION ON A PORTABLE DATA STORAGE MEDIUM, AND SUCH A PORTABLE DATA STORAGE MEDIUM

(71) Applicant: GIESECKE & DEVRIENT GMBH, Munich (DE)

(72) Inventors: Michael Schnellinger, Landshut (DE); Frank Goschenhofer, Augsburg (DE)

(73) Assignee: GIESECKE & DEVRIENT GMBH, Munich (DE)

( * ) Notice: Subject to any disclaimer, the term of this patent is extended or adjusted under 35 U.S.C. 154(b) by 16 days.

(21) Appl. No.: 14/364,563

(22) PCT Filed: Dec. 19, 2012

(86) PCT No.: PCT/EP2012/005280
§ 371 (c)(1),
(2) Date: Jun. 11, 2014

(87) PCT Pub. No.: WO2013/091863
PCT Pub. Date: Jun. 27, 2013

(65) Prior Publication Data
US 2014/0351830 A1  Nov. 27, 2014

(30) Foreign Application Priority Data
Dec. 23, 2011  (DE) ........................ 10 2011 122 242

(51) Int. Cl.
*G06F 21/50* (2013.01)
*G06F 9/54* (2006.01)
(Continued)

(52) U.S. Cl.
CPC ................ *G06F 9/54* (2013.01); *G06F 21/50* (2013.01); *H04W 4/003* (2013.01); *H04W 4/20* (2013.01)

(58) Field of Classification Search
CPC .......... G06F 9/54; G06F 21/50; H04W 4/003; H04W 4/20
See application file for complete search history.

(56) References Cited

U.S. PATENT DOCUMENTS

| | | | | |
|---|---|---|---|---|
| 6,115,040 A | * | 9/2000 | Bladow | ............... G06F 11/0709 707/E17.107 |
| 6,775,398 B1 | * | 8/2004 | Schaeck | ............... G06Q 20/341 235/380 |

(Continued)

FOREIGN PATENT DOCUMENTS

| | | |
|---|---|---|
| EP | 1542486 A1 | 6/2005 |
| EP | 1965596 A1 | 9/2008 |

OTHER PUBLICATIONS

Hansmann et al., "Smart Card Application Development Using Java," Jan. 1, 2002, URL: http://books.google.de/books?id=YGp3vRB0VxMC&pg=PA243&lpg=PA243&dq=java+card+server+proxy&source=bl&ots=3LH5x_JqNi&sig=2z2F5d-sG4uWQpkrvFf0KY8JCIY&hl=en&sa=X&ei=VaukUa7IH4WR7Ab51IC4Bw&ved=0CEsQ6AEwBA#v=onepage&q=java%20card%20server%20proxy&f=false, pp. 243-244.

(Continued)

*Primary Examiner* — H S Sough
*Assistant Examiner* — Carina Yun
(74) *Attorney, Agent, or Firm* — Workman Nydegger

(57) ABSTRACT

A method is described for communicating with an application on a portable data carrier, as well as such a portable data carrier. The method comprises the following steps of: forwarding a command transmitted by an external entity to the portable data carrier, from a runtime environment implemented on the portable data carrier to a proxy application implemented on the portable data carrier; forwarding the command from the proxy application via the runtime envi- (Continued)

ronment to the application; and monitoring the communication between the external entity and the application in the form of the command and/or intervening in the communication by the proxy application.

9 Claims, 2 Drawing Sheets

(51) Int. Cl.
*H04W 4/00* (2009.01)
*H04W 4/20* (2009.01)

(56) References Cited

U.S. PATENT DOCUMENTS

| | | | |
|---|---|---|---|
| 6,874,086 B1* | 3/2005 | Gu | H04L 63/0281 713/151 |
| 2004/0154027 A1 | 8/2004 | Vandewalle et al. | |
| 2004/0213169 A1* | 10/2004 | Allard | G06K 7/10297 370/276 |
| 2004/0235523 A1* | 11/2004 | Schrire et al. | 455/558 |
| 2005/0108571 A1* | 5/2005 | Lu et al. | 713/201 |
| 2006/0266843 A1 | 11/2006 | Flattin et al. | |
| 2007/0083924 A1 | 4/2007 | Lu | |
| 2008/0200220 A1* | 8/2008 | Jackson | G06F 1/3203 455/574 |
| 2011/0276683 A1* | 11/2011 | Goldschlag | H04W 4/00 709/224 |
| 2012/0214577 A1* | 8/2012 | Petersen et al. | 463/25 |

OTHER PUBLICATIONS

International Preliminary Report on Patentability for corresponding International PCT Application No. PCT/EP2012/005280, dated Jun. 24, 2014.
International Search Report for corresponding International PCT Application No. PCT/EP2012/005280, dated Jun. 13, 2013.
"Information Technology—Identification Cards—Integrated Circuit(s) Cards with Contacts—Part 3: Electronic Signals and Transmission Protocols," ISO/IEC CD 7816-3, Apr. 1, 2003, 56 pages.
"Identification Cards—Integrated Circuit Cards—Part 4: Organization, Security and Commands for Interchange," ISO/IEC FCD 7816-4.2, Sep. 26, 2003, 89 pages.
Ortiz, Enrique C., "An Introduction to Java Card Technology—Part 3, The Smart Card Host Application," Sep. 1, 2003, URL: http://www.oracle.com/technetwork/java/javacard/javacard3-138837.html, 7 pages.

* cited by examiner

Fig. 2a ( state of the art )

METHOD FOR COMMUNICATING WITH AN APPLICATION ON A PORTABLE DATA STORAGE MEDIUM, AND SUCH A PORTABLE DATA STORAGE MEDIUM

BACKGROUND

The invention relates to a method for communicating with an application on a portable data carrier and such a portable data carrier.

Portable data carriers, in particular in the form of chip cards or smart cards are employed in a multiplicity of applications today, such as e.g. in mobile telephones as SIM or USIM cards, as bank cards, health cards and the like. Such portable data carriers, for executing corresponding applications, comprise a microprocessor and a plurality of volatile and/or non-volatile memory areas. As a non-volatile memory area e.g. a ROM or EEPROM or a flash memory can be provided. The volatile memory is realized for example as a RAM. In contrast to the non-volatile memory area, data from the volatile memory area are lost when the execution of a process on the data carrier is concluded (card reset) and/or the current supply required for executing processes is cut off.

For the production of platform-independent applications for a portable data carrier particularly object-oriented programming languages are suitable. Here, the Java Card™ technology has taken hold. This technology is described in the Java Card specification that is continually updated and is present in the version 3.0. In the Java Card specification the Java Card virtual machine (JCVM) and the Java Card API (API=application programming interface) are defined, which form the Java Card runtime environment (also referred to as JCRE). Within the framework of the present invention a portable chip card working on the basis of the Java Card specification is referred to as Java card.

SUMMARY

The Java Card™ technology permits the implementation of several applications on a portable data carrier, in particular on a chip card. However, for security reasons the Java Card technology requires that an external entity, for example a chip card terminal (per logical channel) can always communicate only with one application on the chip card, however which is unnecessarily limiting for some applications. For this purpose the chip card terminal, by means of an AID ("application identifier") and a corresponding command, must identify the target application with which the chip card terminal wants to communicate. This known method is represented schematically in FIG. 2a, which will be dealt with in more detail in the subsequent detailed description of the invention.

Against this background it is the object of the present invention to make available a more flexible method for communicating with an application on a portable data carrier, as well as a correspondingly configured portable data carrier.

According to a first aspect of the invention a method is made available for communicating with an application on a portable data carrier. The method comprises the following steps: the forwarding of a command that is transmitted by an external entity to the portable data carrier, from a runtime environment implemented on the portable data carrier to a proxy application implemented on the portable data carrier; the forwarding of the command from the proxy application via the runtime environment to the application; and the monitoring of the communication between the external entity and the application in the form of the command and/or the intervention in this communication by the proxy application.

According to a second aspect of the invention a portable data carrier is made available on which at least one application is implemented and which can communicate with an external entity. On the portable data carrier further a runtime environment and a proxy application are implemented. The runtime environment is configured to forward a command transmitted from the external entity to the portable data carrier to the proxy application. The proxy application is configured to forward the command via the runtime environment to the application and to monitor the communication between the external entity and the application in the form of the command and/or to intervene in this communication.

Preferably, further a proxy API or proxy interface is implemented on the portable data carrier, making available a suitable connection between the runtime environment and the proxy application and being configured to be triggered by commands received by the runtime environment.

According to a preferred embodiment, the step of monitoring the communication between the external entity and the application and/or of intervening in this communication by the proxy application implemented on the portable data carrier comprises the recording of information about the data traffic.

Alternatively or additionally the step of monitoring the communication between the external entity and the application and/or of intervening in this communication by the proxy application implemented on the portable data carrier comprises the monitoring and filtering of data in order to filter data which could endanger the security of the application or of the portable data carrier. For this purpose preferably filter settings, which can operate on the APDU level or application level, are stored in the proxy application implemented on the portable data carrier. The filter settings stored in the proxy application preferably can be changed at any time.

According to a preferred embodiment the step of monitoring the communication between the external entity and the application and/or of intervening in this communication by the proxy application implemented on the portable data carrier alternatively or additionally comprises making available extensions of the application. Preferably the extension of the application permits a previously not existing user interaction, for example in the form of a graphic user interface.

Alternatively or additionally the step of monitoring the communication between the external entity and the application and/or of intervening in this communication by the proxy application implemented on the portable data carrier comprises the switching between different transport protocols and/or application protocols for which the application is not adapted.

Portable data carriers within the meaning of the present invention are data carriers such as chip cards, credit cards, electronic identity cards, electronic passports, SIM cards, data memory cards, etc. In the case of a chip card, the chip card can be contactless or contact-type or a chip card that can be operated both in contactless and contact-type fashion (dual interface card) of any desired format, e.g. according to ISO 7810, e.g. ID-1 (check card format) or ID-000 (SIM card or mini card format) or ID-00 or according to a different standard.

Preferably the portable data carrier is a chip card, in particular in the form of a Java card adapted for an object-oriented programming language. Accordingly, the at least one application and the proxy application are configured as Java Card™ applets executable on the data carrier. Existing Java Card™ components, thus the runtime environment, virtual machine and class library, can be maintained without change. The described extension of the known system by means of the proxy application and the proxy API substantially expands the functionality of the system, while the adaptation effort is minimal and existing security stipulations are neither violated nor limited.

As recognizable to the person skilled in the art, the above-described preferred embodiments can be implemented advantageously both within the framework of the first aspect of the invention, i.e. within the framework of the method for communicating with an application on a portable data carrier, and within the framework of the second aspect of the invention, i.e. within the framework of the portable data carrier.

The invention has the following advantages in particular. A chip card, in particular a Java card, is equipped with a flexible control entity by means of the proxy application, said control entity having access to incoming commands, in particular APDUs, before these are forwarded to the actual target application. Also in the reverse communication direction the proxy application has access to the response of a target application to an incoming command and can change said response. Thus the proxy application permits to influence the communication, preferably in the form of APDUs, between an application available on the portable data carrier and an external entity, for example in the form of a terminal, without having to change the application available on the portable data carrier for this purpose. Further, for example by means of a graphic user interface made available by the proxy application, the proxy application offers more extensive possibilities for action to a user, for example acting on an application that does not make available a graphic user interface of this type, namely without having to modify said application. Finally, the proxy application increases the security of the portable data carrier, since by means of filter settings for example impermissible APDUs and/or applications can be disabled.

BRIEF DESCRIPTION OF THE DRAWINGS

Further features, advantages and objects of the invention are indicated in the following detailed description of several exemplary embodiments and alternative embodiments. Reference is made to the figures, wherein there is shown.

DETAILED DESCRIPTION OF VARIOUS EMBODIMENTS

Figure 1:
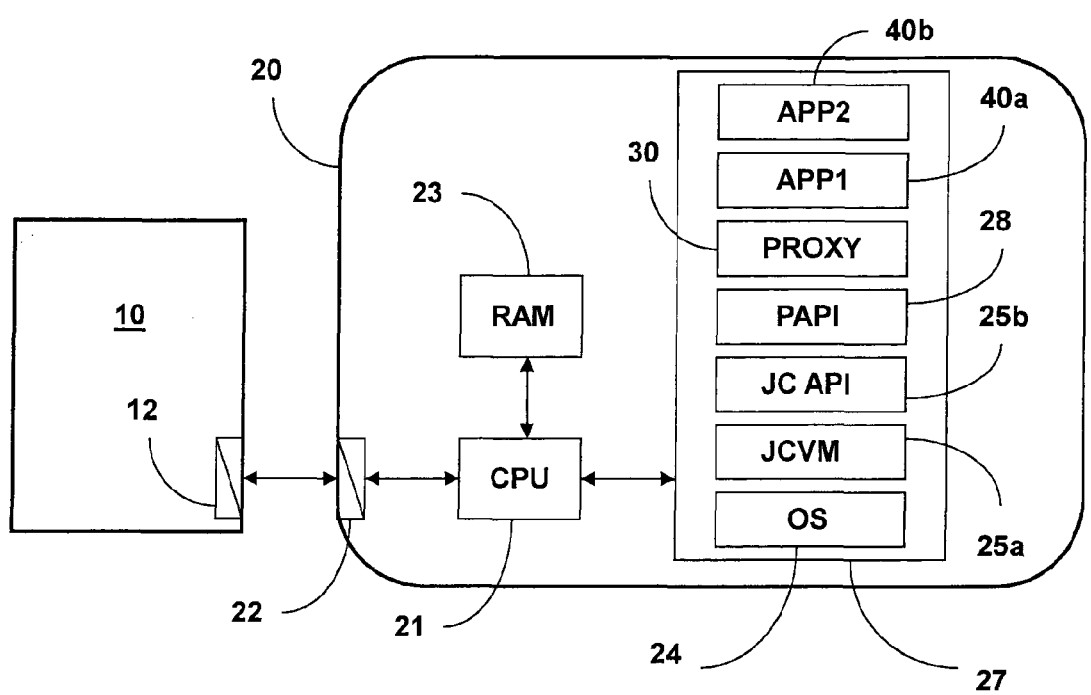
FIG. 1 a schematic representation of a preferred embodiment of a portable data carrier according to the invention in the form of a chip card in communication with an external entity in the form of a terminal, FIG. 2a a schematic representation of the communication channels between an application on a chip card and a terminal according to the state of the art and FIG. 2b a schematic representation illustrating possible communication channels between an application on the portable data carrier in the form of a chip card of FIG. 1 and an external entity in the form of a terminal according to a preferred embodiment of the invention.

FIG. 1 shows a schematic representation of a preferred embodiment of a portable data carrier according to the invention in the form of a chip card 20 in communication with an external entity in the form of a terminal 10. Preferably the chip card 20 is configured as a Java Card™. Of course the present invention can also be realized in a portable data carrier with a different construction type and employing a different card operating system, however.

The chip card 20 represented in FIG. 1 is configured to exchange data with an external entity in the form of a terminal or reading device 10. Here a signal transmission, a mutual control and in simple cases also a connection between the terminal 10 and the chip card 20 are understood as an exchange of data. In information theory, a data exchange is marked among other things by the transmitter-receiver model: Data or information items are coded in characters and then transmitted by a transmitter via a transmission channel to a receiver. It is decisive therein that the transmitter and the receiver employ the same coding in order for the receiver to understand the message, i.e. to be able to decode the data to be exchanged.

For data transmission or communication between the chip card 20 and the terminal 10 both the chip card 20 and the terminal 10 have suitable communication interfaces 22 and 12. The interfaces 22 and 12 can for example be configured so that the communication between these or between the chip card 20 and the terminal 10 takes place in a contactless fashion, i.e. via the air interface. Alternatively the chip card 20 can be connected galvanically, i.e. in a contact-type fashion, to the interface 12 of the terminal 10. In this case the interface 22 as a rule is configured as a contact pad that has contact areas for data exchange with the terminal 10 and is arranged on one side of the chip card 20. Of course the present invention also encompasses such chip cars which have both an interface for contact-type communication and an interface for contactless communication with an external entity, for example in the form of a terminal, and which are known to the person skilled in the art as dual-interface chip cards.

Besides the interface 22 for communication with the terminal 10, the chip card 20 comprises a central processor or computing unit (CPU) 21 that is in a communication connection with the interface 22. As is known, the execution of arithmetic and logical functions and the reading and writing of data elements, as defined by the program code executed by the CPU 21, form part of the primary tasks of the CPU 21. The CPU 21 is further connected to a volatile working memory (RAM) 23 and a non-volatile, rewritable memory 27. Preferably the non-volatile memory 27 is a flash memory (flash EEPROM). It can be a flash memory with a NAND or a NOR architecture for example.

In the preferred embodiment represented in FIG. 1 program code that can be executed by the CPU 21 is stored in the non-volatile memory 27 of the chip card 20. In particular, in the non-volatile memory 27 of the chip card 20 there can be stored the program code of the chip card operating system 24 (OS), the Java Card virtual machine 25a (JCVM), the Java card application programming interface (JC API) 25b, a proxy API 28 (PAPI), a proxy application 30 (PROXY), as well as a first application 40a (APP1) and a second application 40b (APP2). The proxy application 30 (PROXY), the first application 40a (APP1) and the second application 40b (APP2) are preferably present in the form of Java Card™ applets, as described in detail hereinafter in connection with FIG. 2b.

Since the contact-type communication between a terminal and a portable data carrier, for example in the form of a chip card, usually takes place in accordance with the international standards ISO/IEC 7816-3 ("Identification cards—Integrated circuit cards—Part 3: Cards with contacts—Electrical interface and transmission protocols") and ISO/IEC 7816-4 ("Identification cards—Integrated circuit cards—Part 4: Organization, security and commands for interchange"), to which explicit reference is made hereby, preferred embodiments of the invention will be described hereinafter with reference to these standards. However, the person skilled in the art will recognize that the basic idea of the present invention is not limited to a contact-type communication between a terminal or reading device and a portable data carrier while complying with these standards, but can also be used within the framework of different communication standards or communication protocols, for example the standard ISO/IEC 14444 for chip cards communicating in contactless fashion.

Preferably the complete data exchange between the chip card 20 and the terminal 10 takes place employing so-called APDUs (application protocol data units) in accordance with the standard ISO/IEC 7816-4. An APDU represents a data unit of the application layer, thus a type of container with which commands and/or data are transmitted to the chip card 20. A distinction is made between command APDUs sent by a terminal or reading device to a chip card and response APDUs sent by the chip card to the terminal in reaction to a command APDU.

As is known to the person skilled in the art, in the standard ISO/IEC 7816-4 the structure of an APDU is defined to the effect that it consists of a header and a body. The APDU header comprises in particular a class byte (CLA) that is utilized to mark applications and their specific set of commands, as well as an instruction byte (INS) with the actual commands are selected or determined. The APDU body following the APDU header comprises in particular a data field that contains the data associated with the command determined by CLA and INS. For further information on APDUs, reference is made in particular to chapter 8.3 of the book "Handbuch der Chipkarten" (Handbook of chip cards), Wolfgang Rankl and Wolfgang Effing, 5$^{th}$ edition, Carl Hanser Verlag, Munich, 2008, to which reference is hereby made in its entirety.

Usually a terminal communicates always with only one applet on a chip card. When several applets are implemented on a chip card and a terminal wants to change to a different applet, the terminal must first select this different applet, e.g. by means of the command "SELECT" transmitted in an ADPU. This connection is represented schematically in FIG. 2a, which illustrates the data flow between the different software levels of a conventional Java card. The mechanism implemented in a Java card runtime environment (JCRE) for the forwarding of APDUs to the respectively selected applet can be regarded as distributing unit 25c. Said distributing unit 25 as a rule has an AID registry, i.e. a register of applets implemented on the chip card including their AIDs ("application identifiers"), and a global APDU buffer for storing incoming and outgoing APDUs. The distributing unit 25c is configured to check APDUs emitted by the terminal 10 and forwarded by the operating system 24 (OS) for the class byte and instruction byte and to forward them to the corresponding target applet, e.g. the applet 40a or 40b. The AID of an applet is allocated to it by the distributing unit 25c and is unique for each applet. After a communication channel has been set up by the distributing unit 25c between the terminal 10 and an applet, a further communication of the terminal 10 takes place only with this applet, namely until the terminal 10 selects a new applet, for example with the "SELECT" command. The person skilled in the art is familiar with the above-described conventional communication mechanism, for example from the book "Java Card™ Technology for Smart Cards", Zhiqun Chen, Addison-Wesley, 2000, to which explicit reference is made hereby.

As described in detail hereinafter with reference to FIG. 2b, the present invention extends the above-described conventional possibilities of communication between the terminal 10 and a target applet, for example the applet 40a or 40b, on the chip card 20. This extension is preferably implemented in the form of the proxy applet 30 and the proxy API or proxy interface 28, which were described already in connection with FIG. 1, and which will be dealt with in more detail hereinafter.

The proxy API 28 implemented on the chip card 20 makes available a suitable connection between the Java card runtime environment 25 (JCRE) and the proxy applet 30 and is configured to be triggered by APDUs received by the distributing unit 25c, e.g. in the form of an "APDU event". The proxy applet 30 connected with the proxy API 28 is preferably configured to check upon an "APDU event" the global APDU buffer of the distributing unit 25c with the APDU stored there, to change the global APDU buffer and/or to copy an APDU of its own into the global APDU buffer.

According to the invention the proxy applet 30 is further configured to instruct the Java card runtime environment 25 (JCRE) via the proxy API 28 that an APDU is to be processed further, namely with a possibly changed APDU buffer, or that the APDU made available by the proxy applet 30 is to be sent back directly to the terminal 10. This mechanism can be realized for example by a corresponding configuration of the proxy API 28. For example the proxy API 28 can be configured to check an APDU coming from the proxy applet 30 for whether this APDU is intended for the target application or is to be returned directly to the terminal 10.

The proxy API 28 makes it possible in particular that the proxy applet 30 can be realized as a downloadable applet according to the Java card standard. The proxy API 28 thus represents a programming interface ("application programming interface", API) that is configured on the one hand to send events to the proxy applet 30 from the Java card runtime environment 25 (JCRE) or its distributing unit 25c, and on the other hand to communicate actions of the proxy applet 30 back to the Java card runtime environment 25 (JCRE) or its distributing unit 25c (e.g. the rejection or acceptance of a command). The person skilled in the art will recognize that in the simplest case the proxy API 28 can essentially consist merely of a call-up of the proxy applet 30 with a reference to the APDU buffer of the distributing unit 25c.

The configuration of the proxy applet 30 as Java applet among other things has the advantage that established standards permit a remote administration of the proxy applet 30, for example to change settings of the proxy applet 30. Further, there is the possibility, as already described above, to install the proxy applet 30 on the chip card 20 only when the chip card 20 is already disposed in the field.

The proxy applet 30 is preferably in particular configured to carry out the following actions. Incoming APDUs (as a rule command APDUs) can be searched by means of the proxy applet 30 on the basis of configurable filter settings (e.g. "SELECT APP1"). When for example an AID of a target applet defined in the filter settings is found by the proxy applet 30 in an APDU, further actions of the proxy applet 30 are triggered.

Preferably the filter settings stored in the proxy applet 30 that can operate on the APDU level or the applet level, contain one or several of the following elements: a negative list of APDUs and/or applets by means of which the APDUs and/or applets of the available APDUs and/or of the available applets are defined which are to be blocked; a positive list of APDUs and/or applets by means of which the APDUs and/or applets of the available APDUs and/or of the available applets are defined which are permissible. By means of a negative list stored in the proxy applet 30 e.g. individual APDUs or commands can be disabled in a targeted fashion. For example all commands "SELECT AID" can be suppressed thereby, so that a selection of the applets available on the chip card 20 can be carried out only by means of the proxy applet 30.

Preferably the proxy applet 30 is so configured that the filter settings of the proxy applet 30 can be changed at any time. For the preferred case that the chip card 20 is for example a SIM card for a mobile telephone, it is conceivable that such changes of the filter settings of the proxy applet 30 can be carried out directly by a user by means of the mobile telephone. Alternatively or additionally it is conceivable that such changes of the filter settings of the proxy applet 30 are carried out without direct user action by an application running on the mobile telephone. In order to be able to prevent unauthorized changes of the filter settings of the proxy applet 30, preferably corresponding security mechanisms are implemented on the chip card 20. For example the chip card 20 or the proxy applet 30 can be so configured that a change of the filter settings of the proxy applet 30 is possible by an external entity only when said external entity has authenticated itself to the chip card 20, for example by means of a common secret, such as a password (PIN or TAN) and/or biometric features.

For the preferred case that the chip card 20 is for example a SIM card for a mobile telephone, on the mobile telephone preferably an application is implemented which makes it possible for the user of the mobile telephone to change the filter settings of the proxy applet 30, for example by means of a graphic user interface made available by the application. Additionally or alternatively the filter settings of the proxy applet 30 can be changed by implementing a web server on the chip card 20, said web server being accessed by means of a web browser to change the filter settings of the proxy applet 30. According to a further alternative, also a SIM toolkit application can be used to change the filter settings of the proxy applet 30. According to another further preferred embodiment, the filter settings of the proxy applet 30 can be loaded OTA (over the air) directly unto the chip card 20 from a server of a background system.

For the preferred case that the chip card 20 is for example a SIM card for a mobile telephone, on which an application is implemented making it possible for the user of the mobile telephone to change the filter settings of the proxy applet 30 for example by means of a graphic user interface made available by the application, it can preferably be provided that upon changing the filter settings of the proxy applet 30 further information is considered that is made available by the mobile telephone. For example information about the geographic position of the mobile telephone that can be detected by means of a GPS module and/or the mobile telephone cell in which the mobile telephone is disposed can be employed to prioritize or to disable certain applets available on the chip card 20 in certain places or in certain stores. By means of this configuration of the proxy applet 30 for example a simple theft protection can be realized by so choosing the filter settings of the proxy applet 30 that certain transactions made available by applets are disabled by the proxy applet 30 outside of defined geographic areas.

By means of the above-described filter settings stored in the proxy applet 30 the proxy applet 30 can serve as firewall on the APDU level between the terminal 10 and the applets available on the chip card 20. Further, upon receiving certain commands and/or APDUs defined in the filter settings, actions determined by the proxy applet 30 can be triggered, such as for example the notification of the user about the selection of a certain one of the applets available on the chip card 20.

When the chip card 20 is operated as security module in a mobile telephone it is conceivable that the proxy applet 30 is equipped with a graphic user interface which e.g. informs the user on the display of the mobile telephone that the proxy applet 30 is activated. This graphic user interface of the proxy applet 30 can also be employed to have the user make a decision, for example the selection between two different applets on the chip card 20 that is performed correspondingly by the proxy applet 30.

For example the proxy applet 30 can be configured to generate, as soon as this has been triggered by an incoming APDU, a list of suitable applets available on the chip card 20 and present said list to the user for selection. Preferably the proxy applet 30 can generate this list of suitable applets available on the chip card 20 as a prioritized list.

Due to the above-described configurations the proxy applet 30 is in a position to ensure that the terminal complies with the response APDU to a "SELECT AID" command generated by the proxy applet 30 and does not select a different applet with a different AID nevertheless. Preferably the proxy applet 30 is configured, in such a case, to block the access of the terminal 10 to the other different applet with a different AID and to only end this blocking after confirmation by the user.

Figure 2B:
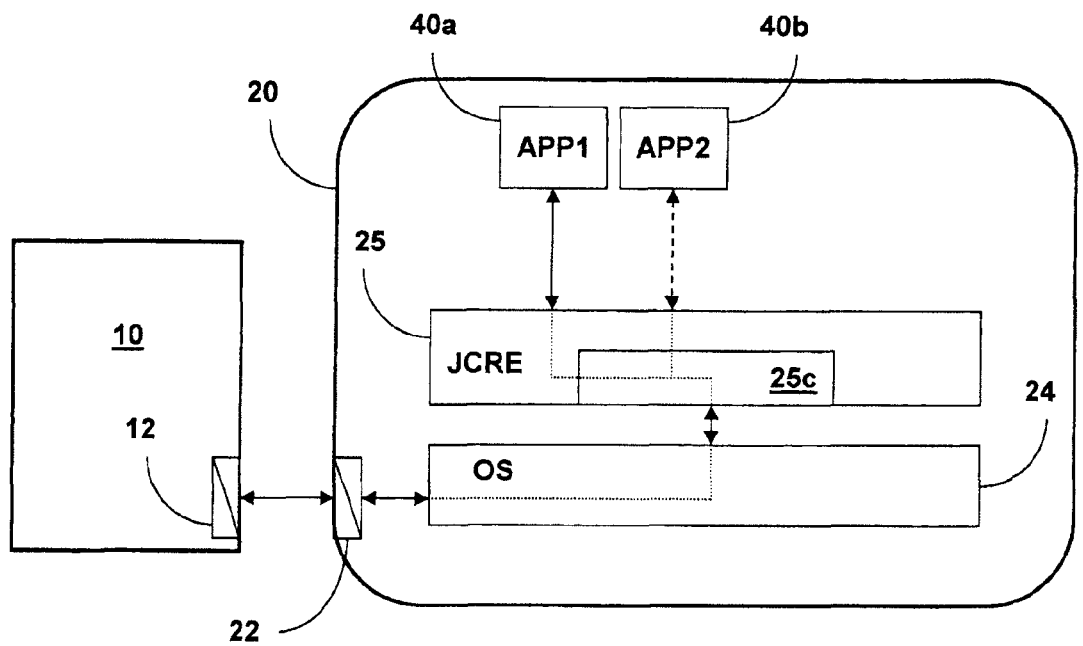
Figure 2B:
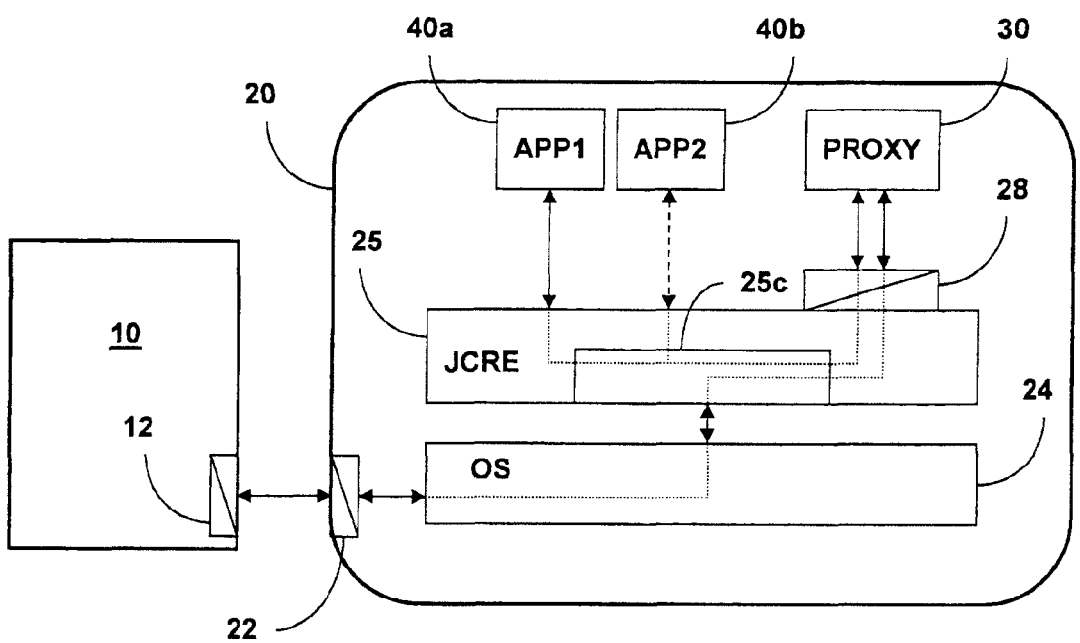

As schematically represented in FIG. 2b, in an embodiment of the chip card 20 according to the invention different communication channels can be used between the terminal 10 and the chip card 20. For example the response APDU generated by a target applet, e.g. the applet 40a or 40b, can be sent first via the proxy API 28 to the proxy applet 30, to be checked there by the proxy applet 30, and can be sent back subsequently via the proxy API 28 and the Java card runtime environment 25 (JCRE) or its distributing unit 25c to the terminal 10. However, it is also conceivable that a response APDU generated by a target applet is sent directly by the target applet (e.g. the applet 40a or the applet 40b) via the Java card runtime environment 25 (JCRE) back to the terminal 10.

Hereinafter, some preferred application possibilities of the above-explained configuration according to the invention are described.

The chip card 20 can for example be configured to be used as a security module in the form of a SIM card in a mobile telephone. In a mobile telephone the case frequently occurs that an application implemented on the mobile telephone should be able to communicate safely with an applet implemented on the SIM card. In current suggestions to secure modern operating systems of mobile telephones, such as e.g. the operating system Android, the security is offered by the software stack of the mobile telephone that forms the APDU interface between an application implemented on the mobile telephone and an applet implemented on the SIM card. A known solution consists of a cryptographic structure in accordance with the standard ISO 7816-15 or PKCS#15 being made available on the SIM card with access rules, for example with the indication that certain APDUs must not be sent to certain applets on the SIM card defined by their AIDs. A different known solution provides that the software stack of the mobile telephone is configured to query the current security rules from an applet on the SIM card. However, whether these security rules are complied with depends on the configuration of the mobile telephone's software stack, since the SIM card merely delivers the information, for example the security rules, stored in the SIM card for example within the framework of the personalization. Consequently, this security can be undermined easily by an attack on the operating system and thereby on the software stack of the mobile telephone.

This problem can be solved by a configuration according to the invention of the SIM card with the proxy applet 30. In particular, by means of the proxy applet 30 the security rules stored in the SIM card can be enforced or blocked additionally on the side of the SIM card. The only applicable limitation here is that the enforcement or blocking of the security rules stored in the SIM card on the side of the SIM card by means of the proxy applet 30 is applicable to all applications of a mobile telephone, i.e. it is not possible to distinguish between different applications of the mobile telephone. The SIM card accordingly has no information as to which application on a mobile telephone has sent a command to the SIM card or whether the corresponding application is trustworthy.

Besides the above-described security application the present invention can be used advantageously in the following scenarios in particular. The proxy applet 30 can for example serve to extend the range of functions of target applets without having to change the target applet itself in the process. Further, the proxy applet 30 can for example be used advantageously to implement different transport protocols or application protocols for which an application was originally not adapted.

The invention claimed is:

1. A method for communicating with an application on a portable data carrier, wherein the method comprises the following steps of:
    forwarding a command transmitted by an external entity to the portable data carrier, from a runtime environment implemented on the portable data carrier to a proxy application implemented on the portable data carrier;
    forwarding the command from the proxy application via the runtime environment to the application; and
    monitoring the communication between the external entity and the application in the form of the command, the monitoring triggering one or more actions in relation to said communication by the proxy application, the one or more actions including prioritizing or disabling the application based on information specifying the geographic position of the portable data carrier,
    wherein the step of monitoring the communication between the external entity and the application or of intervening in said communication by the proxy application implemented on the portable data carrier comprises the switching between a different transport protocol or application protocol for which the application is not adapted, such that the proxy application allows communication over a protocol that is unsupported by the application,
    wherein the step of monitoring the communication between the external entity and the application or of intervening in said communication by the proxy application implemented on the portable data carrier includes providing additional functionality not provided by the application without modifying the application,
    wherein the step of monitoring the communication between the external entity and the application or of intervening in said communication by the proxy application implemented on the portable data carrier comprises making available extensions of the application, at least one of the extensions including making a specific user interaction possible by providing a graphic user interface for an application that does not provide a graphic user interface for the specific type of user interaction, the graphic user interface being provided without modifying the application, and
    wherein the proxy application is activated upon receipt of one or more specified application protocol data units (APDUs) that are part of an APDU event, the APDU's being stored in a global APDU buffer that allows the APDUs to be changed during transport, the proxy application further including a proxy API that is configured to communicate actions of the proxy application back to the runtime environment indicating rejection or acceptance of one or more APDU commands currently in the APDU buffer.

2. The method according to claim 1, wherein the forwarding of the commands takes place via a proxy API implemented on the portable data carrier, which makes available a suitable connection between the runtime environment and the proxy application and is configured to be triggered by commands received by the runtime environment.

3. The method according to claim 1, wherein the step of monitoring the communication between the external entity and the application or of intervening in said communication by the proxy application implemented on the portable data carrier comprises the recording of information about the data traffic.

4. The method according to claim 1, wherein the step of monitoring the communication between the external entity and the application or of intervening in said communication by the proxy application implemented on the portable data carrier comprises the monitoring and filtering of data, in order to filter data which could endanger the security of the application or of the portable data carrier.

5. The method according to claim 4, wherein in the proxy application implemented on the portable data carrier filter settings are stored that can operate on the APDU level or application level.

6. The method according to claim 5, wherein the filter settings stored in the proxy application can be changed subsequently.

7. The method of claim 1, wherein the portable data carrier comprises a chip card and wherein the external entity comprises a chip card terminal.

8. A portable data carrier comprising at least one microprocessor and a memory, on which at least one application is implemented and which can communicate with an external entity,
    wherein on the portable data carrier further a runtime environment and a proxy application are implemented,
    wherein the runtime environment is configured to forward a command transmitted by the external entity to the portable data carrier to the proxy application,
    wherein the proxy application is configured to forward the command via the runtime environment to the application and to monitor the communication between the external entity and the application in the form of the command, the monitoring triggering intervening in said communication, the intervening including prioritizing or disabling the application based on information specifying the geographic position of the portable data carrier, wherein monitoring the communication between the external entity and the application or of intervening in said communication by the proxy application implemented on the portable data carrier comprises the switching between a different transport protocol or application protocol for which the application is not adapted, such that the proxy application allows communication over a protocol that is unsupported by the application, wherein the step of monitoring the communication between the external entity and the application or of intervening in said communication by the proxy application implemented on the portable data carrier includes providing additional functionality not provided by the application without modifying the application, and wherein the step of monitoring the communication between the external entity and the application or of intervening in said communication by the proxy application implemented on the portable data carrier comprises making available extensions of the application, at least one of the extensions including making a specific user interaction possible by providing a graphic user interface for an application that does not provide a graphic user interface for the specific type of user interaction, the graphic user interface being provided without modifying the application; and wherein the proxy application is activated upon receipt of one or more specified application protocol data units (APDUs) that are part of an APDU event, the APDU's being stored in a global APDU buffer that allows the APDUs to be changed during transport, the proxy application further including a proxy API that is configured to communicate actions of the proxy application back to the runtime environment indicating rejection or acceptance of one or more APDU commands currently in the APDU buffer.

9. The portable data carrier of claim 8, wherein the portable data carrier comprises a chip card.

* * * * *

UNITED STATES PATENT AND TRADEMARK OFFICE
CERTIFICATE OF CORRECTION

| | | |
|---|---|---|
| PATENT NO. | : 9,830,203 B2 | Page 1 of 1 |
| APPLICATION NO. | : 14/364563 | |
| DATED | : November 28, 2017 | |
| INVENTOR(S) | : Schnellinger et al. | |

It is certified that error appears in the above-identified patent and that said Letters Patent is hereby corrected as shown below:

On the Title Page

<u>Upper Left Hand Column</u>
Item (73) Assignee: change "Giesecke & Devrient GMBH" to --GIESECKE+DEVRIENT MOBILE SECURITY GMBH--

Signed and Sealed this
Twelfth Day of February, 2019

Andrei Iancu
*Director of the United States Patent and Trademark Office*